United States Patent
Mayer

(10) Patent No.: US 7,303,025 B2
(45) Date of Patent: Dec. 4, 2007

(54) MOTOR-DRIVEN WORK APPARATUS

(75) Inventor: Günter Mayer, Untereisesheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 264 days.

(21) Appl. No.: 11/013,438

(22) Filed: Dec. 17, 2004

(65) Prior Publication Data

US 2005/0132691 A1  Jun. 23, 2005

(30) Foreign Application Priority Data

Dec. 22, 2003  (DE) ............... 103 60 885

(51) Int. Cl.
*A01B 33/00* (2006.01)
(52) U.S. Cl. .................. 172/123; 172/518
(58) Field of Classification Search .......... 172/556, 172/518, 119, 123; 30/276, 347
See application file for complete search history.

(56) References Cited

U.S. PATENT DOCUMENTS

| | | | | |
|---|---|---|---|---|
| 2,029,498 A * | 2/1936 | Newton | ............... | 56/293 |
| 2,515,268 A * | 7/1950 | Seaman | ............... | 172/96 |
| 2,802,408 A * | 8/1957 | Seaman | ............... | 172/533 |
| 2,943,687 A * | 7/1960 | Berle et al. | ............... | 172/125 |
| 2,995,195 A * | 8/1961 | Maguire | ............... | 172/556 |
| 3,104,509 A * | 9/1963 | Clendenin et al. | ............... | 56/1 |
| 3,125,166 A * | 3/1964 | Hines, Sr. | ............... | 172/120 |
| 3,550,657 A * | 12/1970 | Swanke | ............... | 241/199.1 |
| 3,946,543 A * | 3/1976 | Templeton | ............... | 56/10.9 |
| 4,280,565 A * | 7/1981 | van der Lely | ............... | 172/548 |
| 4,421,177 A * | 12/1983 | Schlapman et al. | ............... | 172/63 |
| 5,722,525 A * | 3/1998 | Ament et al. | ............... | 192/70.17 |
| 5,820,466 A * | 10/1998 | Graton et al. | ............... | 464/68.41 |
| 5,896,932 A * | 4/1999 | Bruns et al. | ............... | 172/556 |
| 6,151,877 A * | 11/2000 | Rowse et al. | ............... | 56/372 |
| 6,523,618 B2 * | 2/2003 | Firdaus | ............... | 172/540 |
| 2004/0149466 A1 * | 8/2004 | Stark | ............... | 172/518 |

* cited by examiner

*Primary Examiner*—Árpád Fábián Kovács
(74) *Attorney, Agent, or Firm*—Walter Ottesen

(57) ABSTRACT

A rotatably driveable work tool (1) of a motor-driven work apparatus has, at a front end (2, 3), an end plate (5, 6) lying perpendicularly to a rotational axis (4). The end plate (5, 6) has an outer diameter ($D_R$) which is less than a flight circular diameter ($D_F$) of the work tool (1). The end plate (5, 6) is configured as a roll-up protective ring (8) which extends in a radial direction (14) from an inner diameter ($D_I$) to the outer diameter ($D_R$). The roll-up protective ring has an axially-extending component from the work tool (1) outwardly.

11 Claims, 3 Drawing Sheets

MOTOR-DRIVEN WORK APPARATUS

CROSS REFERENCE TO RELATED APPLICATION

This application claims priority of German patent application no. 103 60 888.5, filed Dec. 22, 2003, the entire content of which is incorporated herein by reference.

BACKGROUND OF THE INVENTION

In grass surfaces such as garden facilities having ornamental grass or in sport fields, an unwanted growth especially of moss, creeper plants or the like can develop between the grass blades. This plant material tends to displace the grass plants in an unwanted manner and, as a consequence thereof, the occasional treatment or processing with a work apparatus can be required.

Handheld, motor-driven work apparatus are known which have a processing roller driven in rotation. The processing roller can be a tine roller with tines for removing moss, a cultivating roller or a scarifier roller for ground treatment, a roller-shaped cleaning brush or the like. In lieu of the processing roller, disc-shaped work tools can be provided such as star-shaped cultivating blades or cutting blades. In the example of a tine roller for moss removal, the tine roller is provided with a plurality of tines which are held by tine carriers between two end carrier plates. For processing grass surfaces, rotation is imparted to the tine roller by means of the drive motor and the tine roller is guided over the grass surface to be treated with its rotational axis lying parallel to the surface. The elastic tines rotate with the tine roller and comb through the grass surface and rake the loose vegetation out which has formed between the grass blades. The raked-out plant material is flung away because of the centrifugal force of the rotating tine roller.

Depending upon the processing conditions, long fiber plant material such as cut long grass blades, creeper vine plants or the like can also be taken up by the tine roller in addition to loose moss. The long fiber plant material tends to get caught in the tines of the tine roller in such a manner that it cannot be flung away.

Rotation is imparted to the tine roller via drive means such as a drive transmission mounted at a front end. The drive means include fixed housing components or the like with reference to which the tine roller executes a relative rotation. Long fiber plant material, which rolls up on the tine roller in an unwanted manner, can seat between the tine roller and the drive transmission thereby impeding the rotational movement of the tine roller. The rotational movement of the tine roller supports a winding pull-in of the plant material into the intermediate space at the side of the drive transmission. A hardening of the plant material occurs. With increasing hardening, the resistance to rotation of the tine roller increases. This can lead to a thermal and/or mechanical overload of the drive train and especially of the drive transmission. Comparative problems can also occur in the remaining above-mentioned embodiments of the work apparatus.

SUMMARY OF THE INVENTION

It is an object of the invention to provide a motor-driven work apparatus of the kind described above which is improved to provide operational reliability.

The motor-driven work apparatus of the invention includes: a rotatably driven work tool defining a rotational axis and having a longitudinal end; the work tool defining a flight circle as the work tool rotates about the rotational axis and the flight circle having a diameter ($D_F$); an end plate disposed at the longitudinal end so as to lie perpendicular to the rotational axis and the end plate having an outer diameter ($D_R$) which is less than the flight circle diameter ($D_F$); the end plate having an outer annular portion extending from an inner diameter ($D_I$) to the outer diameter ($D_R$) and the outer annular portion being configured as a roll-up protective ring; and, the roll-up protective ring having a radial component which extends radially from the inner diameter ($D_I$) to the outer diameter ($D_R$) and having an axial component extending outwardly away from the work tool.

An arrangement is suggested wherein the work apparatus has an end plate at an end which lies perpendicularly to the rotational axis. The end plate has an outer diameter which is less than a flight circle diameter of the flight circle traced by the work tool. The end plate is configured as a protective ring to protect against roll-up. This roll-up protective ring extends in a radial direction from an inner diameter to the outer diameter and has an axial extension component from the work tool toward the outside.

When taking up longer cut plant material (vine plants or the like), the plant matter, which is taken up by the work tool, remains in the axial region of the work tool. An axial migration beyond the outer diameter of the end plate is avoided or at least hindered by the configuration as a roll-up protective ring. Adjacent components having a deviating rotational speed such as a drive transmission or a running wheel, which is rotatable independently of the work tool, can be held free of long fibrous plant material. A relative rotatability of the work tool with reference to the adjoining components remains unhindered. At least a portion of the adjacent components can be covered in the peripheral direction because of the axial extension component. A radial penetration of the plant material in this region is made difficult. The outer diameter, which is less with reference to the flight circle diameter of the work tool, permits an unhindered contact of the work tool with the surface to be processed. The roll-up protective ring operates as a depth stop for an elastic configuration of the work tool with bristles, tines or the like or the remaining parts is prevented.

In a configuration of the work apparatus having a drive transmission, which is arranged at the front end of the processing roller, it is advantageous to cover a lateral bearing region of the drive transmission at least partially with an adjacent roll-up protective ring in axial direction with the bearing region facing toward the work tool. During operation, the work tool rotates at a high relative speed about the bearing region. The at least partial axial covering prevents a contact of the corresponding transmission region with the ground region to be processed or treated. The take-up and the roll-up of long fibrous plant material is avoided. The free rotatability of the work apparatus is permanently guaranteed. The drive train and especially the transmission are subjected only to slight load. The lack of rolled-up plant material in this region permits an unhindered removal of heat.

In an advantageous embodiment, the roll-up protective ring is configured as a conical disc at least in a part region. An inclined angle of the conical disc referred to a radial direction lies in the range between 20° and 30°. The conical configuration of the disc leads to a funnel effect in addition to the peripheral covering effect. Taken-up plant matter is guided with the aid of the conical inclination from the axial peripheral regions in a direction to the center region of the work tool. The axial peripheral region, which is critical with respect to a possible blocking action, is reliably held clear.

In an advantageous embodiment, the roll-up protective ring is configured as an approximately cylindrical protective sleeve at least in a component region. Within the cylindrical protective sleeve, there is an effectively covered space which is held clear of plant parts. The cylindrical protective sleeve engages in a peripherally-extending slot of a running wheel mounted laterally of the end plate. This provides a virtually hermetically closed covering of the intermediate space between work tool and running wheel. A penetration of plant matter is avoided with good effectiveness. A free rotatability of the running wheel relative to the work tool is reliably maintained.

In a practical embodiment, the work tool is configured as a rotatingly driveable processing roller. The processing roller includes carrier plates for attaching work tools and these carrier plates lie on mutually opposite ends of the processing roller and are perpendicular to the axis of rotation. The carrier plates have an outer diameter being slightly greater than an attachment diameter with which the tool carriers are fixed to the carrier plates. The roll-up protective ring with its inner diameter is flush on the outside with the outer diameter of the carrier plate. The diameter of the carrier plate is pregiven by the attachment diameter of the tool carrier. The outer diameter is greater than the attachment diameter or the corresponding pitch circle diameter only by the amount needed for attaching the tool carrier. The two-ended arrangement of roll-up protective rings permits a reliable operation also for elongatedly configured processing rollers which are journalled at both ends or are driven at one end and are supported at the other end by a running wheel. A functioning unit is formed from the roll-up protective ring and the corresponding carrier plates which mutually support each other with respect to their roll-up protective effect. The roll-up effect of the carrier plate, which is known from the state of the art, is in opposition hereto. Together with the outer end roll-up protective ring, the carrier plate contributes to the roll-up protection.

Another embodiment has attachment means for the tool carrier axially outside of the carrier plate. In this embodiment, the roll-up protective ring extends in an axial direction beyond the attachment means. This covering of the attachment means, which is effected peripherally, avoids direct contact thereof with plant parts lying on the ground or taken up by the processing roller. Projecting screw heads or the like cannot either take up plant material in an unwanted manner or contribute to a pulling-in or rolling-up of the material in the axial intermediate space between the processing roller and the adjoining component.

An embodiment has been shown to be advantageous wherein an outer diameter of the roll-up protective ring has a magnitude of approximately 1.5 times and especially approximately twice the attachment diameter of the tool carrier. In this diameter range, the roll-up protective ring has, on the one hand, a reliable protective function without the radially projecting tools such as tines, scarifier blades or the like being affected in their operation. On the other hand, the large roll-up protective ring operates as a depth stop for the processing roller. A radial approximation of the processing roller to the ground is limited by the outer diameter of the roll-up protective ring. This radial approximation of the processing roller is associated, for example, with a deflection of the tines. An overload of the tool is avoided.

The carrier plates and the roll-up protective ring are advantageously configured as one piece. Bumping locations, overlaps, attachment means or the like on which plant material could become seated are avoided. Thus, a lesser manufacturing and assembly complexity results.

In an advantageous embodiment, two work tools are provided symmetrically to a center drive transmission. The corresponding carrier plates, which laterally adjoin the drive train, with the roll-up protective rings cover the central drive transmission on both sides at least almost completely. Plant material can hardly penetrate into the remaining gap. If nonetheless some plant material does penetrate, this can be removed with little effort through the remaining gap.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
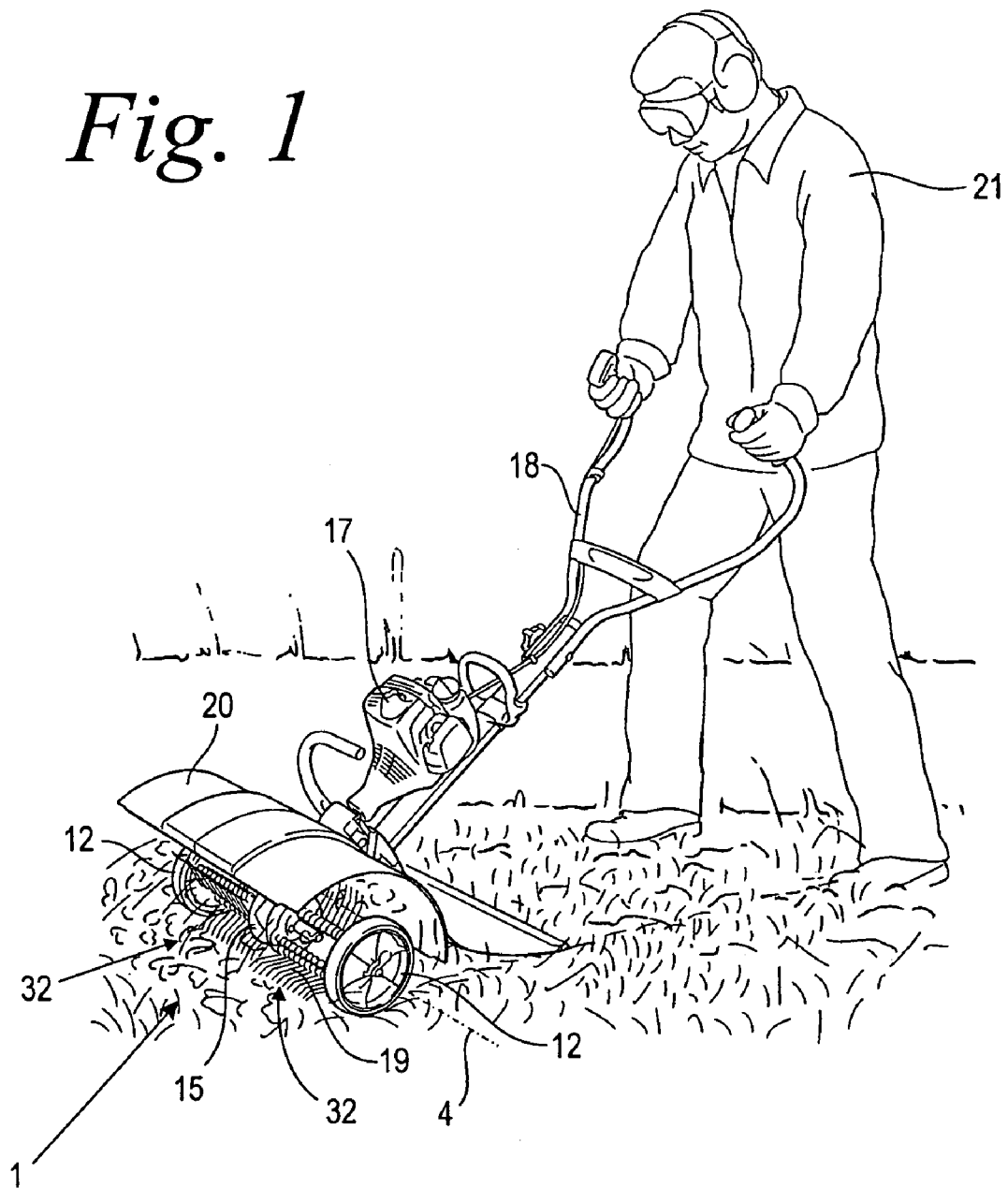
FIG. 1 is a schematic overview of a motor-driven work apparatus which is here, by way of example, a moss remover shown in operation.

FIG. 1 shows an overview of a motor-driven work apparatus. Here, a moss remover is shown by way of example and includes a drive motor 17 configured as an internal combustion engine. The moss remover also includes work tool 1 driven by the engine 17. The work apparatus can also be a motor-driven cultivator, a scarifier or a sweeper or the like as well as a combination apparatus having work tools 1 which can be exchanged as required. The drive motor 17 drives two processing rollers 32 in rotation. The motor 17 drives the rollers 32 via a central drive transmission 15 close to the ground and the two processing rollers 32 conjointly define the work tool 1. In the embodiment shown, the processing rollers 32 are configured as tine rollers having tines 19. An electric motor can be provided in lieu of the internal combustion engine.

The two processing rollers 32 rotate about a rotational axis 4 lying parallel to the ground surface. The rotational axis 4 lies transversely to the thrust direction. A running wheel 12 is freely rotatably mounted at each of the two free ends of the processing rollers 32. With the rollers 32, the work apparatus can be pushed transversely to the rotational axis 4 by an operator 21 utilizing a handle 18. The rotationally-driven processing rollers 32 have a plurality of radially-extending tines 19 which rake out moss and other ground plants from between the grass plants.

The region of the drive transmission 15, the processing rollers 32 and the running wheels 12 is shielded in the direction of the operator 21 by means of a protective cover 20.

Figure 2:
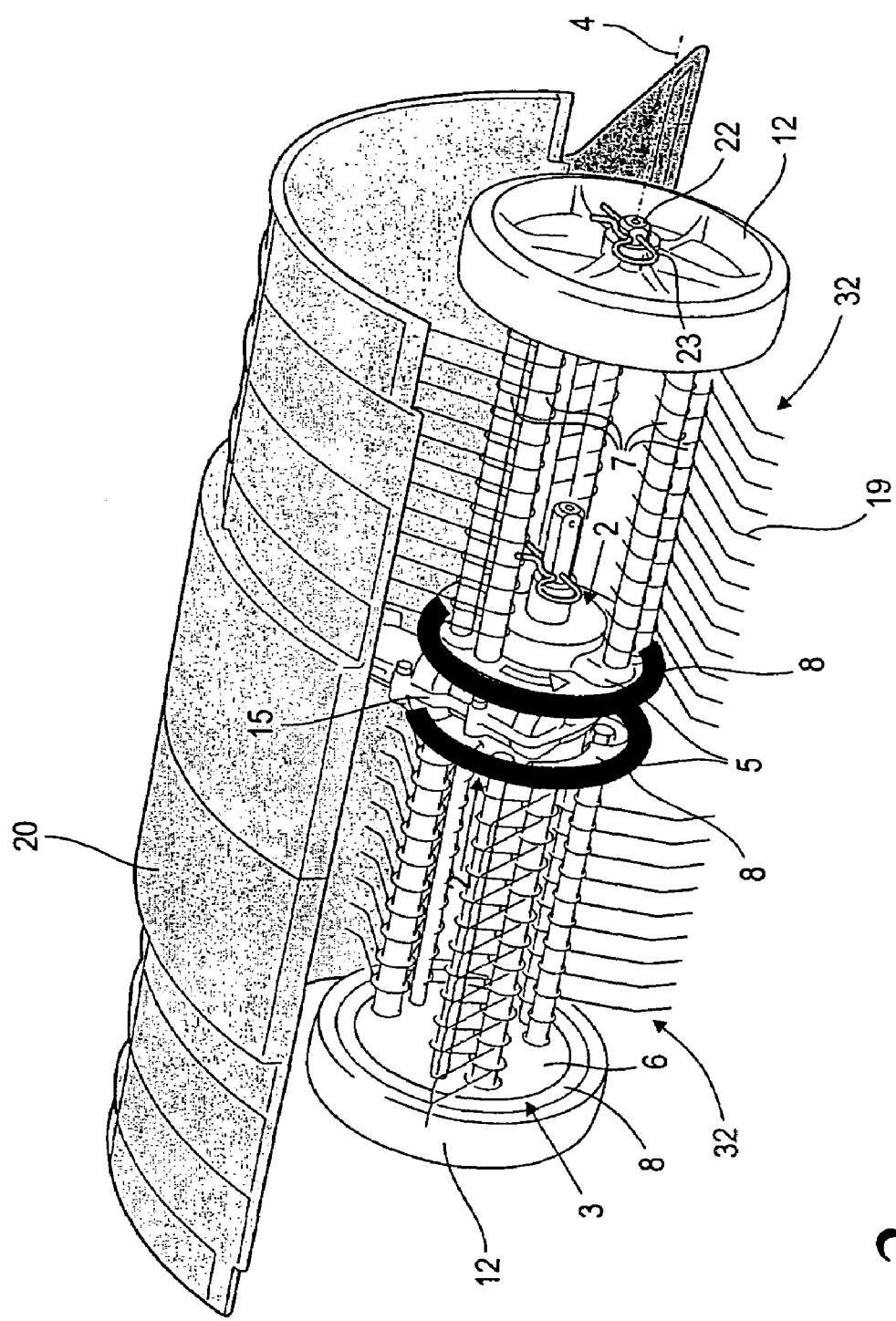
FIG. 2 is an enlarged detail view showing the region of the tine rollers of the work apparatus of FIG. 1; and, FIG. 3 shows a front view, partially in section, of the central drive transmission with the tine rollers of FIG. 2 mounted on both sides thereof.

FIG. 2 shows a perspective detail view of the work apparatus of FIG. 1 in the region of the processing rollers 32. The two processing rollers 32 each have circular disc-shaped carrier plates (29, 30) at their ends. Rod-shaped tool carriers 7 are mounted between the carrier plates (29, 30) of each roller 32 and are distributed over the periphery. The tool carriers 7 function as tine carriers. A plurality of tines 19 are mounted on the tool carriers 7 so as to be elastically resilient. The tines 19 project radially with tangential components and deflect when coming into contact with the ground to be treated.

The running wheels 12 are freely rotatably journalled on axle segments 22 axially outside of respective ones of the outer carrier plates 30. The running wheels 12 are held in their positions by holding pins 23.

The two inner carrier plates 29 and the two outer carrier plates 30 each have a radially outer-lying roll-up protective ring 8 which is described in greater detail in connection with FIG. 3.

Figure 3:
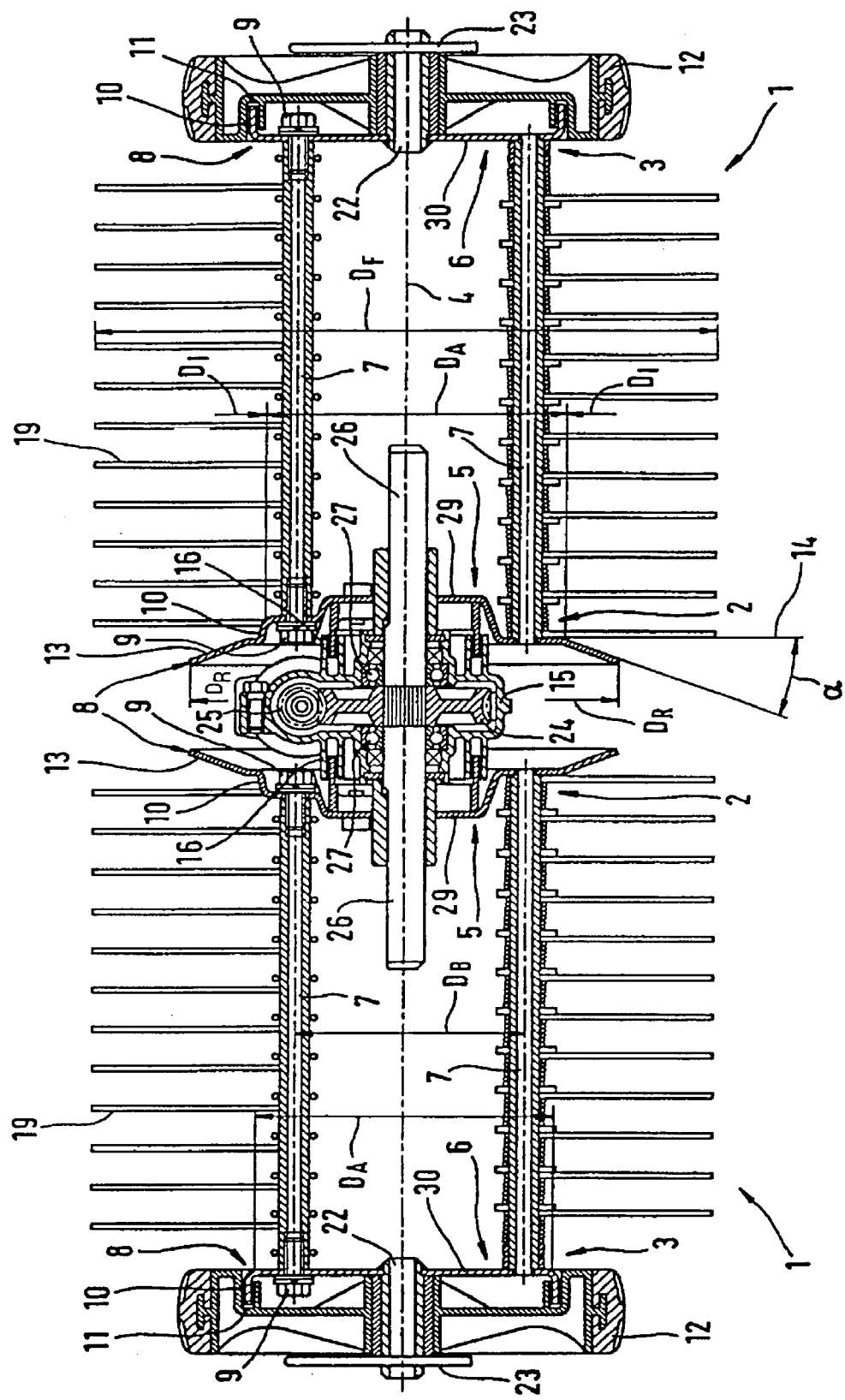

FIG. 3 shows the arrangement of FIG. 2 wherein processing rollers 32 are mounted symmetrically to the center drive transmission 15 at both sides thereof. The drive transmission 15 includes a worm gear 25 which is rotatably driven by the drive motor 17 (FIG. 1). A shaft 26 is arranged coaxially to the rotational axis 4. The shaft 26 with a spur gear 24 is rotatably journalled by ball bearings 27 in lateral bearing regions 16 of the drive transmission 15. The worm gear 25 meshes with the spur gear 24 and rotatingly drives the shaft 26.

The two processing rollers 32 have respective carrier plates 29 at their ends 2 facing toward the drive transmission 15. The carrier plate 29 is connected to the drive shaft 26 so as to rotate therewith. The carrier plates 30 are mounted on the ends 3 facing away from the drive transmission 15. The carrier plates 30 are rigidly connected to the inner carrier plates 29 via the plurality of tool carriers 7 distributed uniformly over the periphery. A plurality of radially-projecting tines 19 are held on the rod-shaped tool carriers 7. The rigid unit of the carrier plates (29, 30), the tool carriers 7 and the tines 19 attached elastically thereto is rotated as a unit by the shaft 26. The tines 19 define a flight trace having a flight circular diameter $D_F$.

Axle segments 22 are fixed on corresponding ones of the two outer carrier plates 30 coaxially to the rotational axis 4. Running wheels 12 are slideably rotatably journalled on corresponding ones of the axle segments 22. A holding pin 23 is arranged on the outside and prevents an axial slippage of the running wheel 12 from its axle segment. During operation, the processing rollers 32 execute a relative rotation to the stationary drive transmission 15. The slideably journalled running wheels 12 can have a rotational speed which deviates from the rotational speed of the processing rollers 32 and, as a consequence, a relative rotation results between the two components.

Referred to the axial direction, attachment means 9 are provided on the outside of each two carrier plates (29, 30) which belong together. The tool carriers 7 are attached to the carrier plates (29, 30) by the attachment means 9. In the embodiment shown, the attachment means 9 are configured as screws rotated coaxially into the tube-shaped tool carriers 7. It can also be practical that the attachment means be a weld connection, rivet connection or insert connection or the like. An attachment diameter $D_B$ is pregiven by the center lines of the tool carriers 7 and the corresponding attachment means 9. The two end carrier plates (29, 30) have outer diameters $D_A$ which are required for a reliable attachment of the tool carriers 7 in the attachment diameter $D_B$. The outer diameter $D_A$ is only slightly greater than the attachment diameter $D_B$.

A roll-up protective ring 8 is arranged on each of the two carrier plates (29, 30) radially outside of the outer diameter $D_A$. It can be practical, as required, to provide a roll-up protective ring 8 only on the transmission-end carrier plate 29 or on the wheel-end carrier plate 30.

The roll-up protective ring 8 is disposed on each of the outer-end carrier plates 30 and is configured to be an approximately cylindrical protective sleeve 10a which extends in axial direction from the processing roller 32 out up to beyond the attachment means 9. The cylindrical protective sleeve 10a engages in a peripherally-extending slot 11 of the running wheel 12 mounted next to the carrier plate 30.

A roll-up protective ring 8 is disposed at each of the two inner carrier plates 29, which face toward the drive transmission 15, radially outside of the outer diameter $D_A$. The roll-up protective ring 8 is configured in a part region thereof to be approximately a cylindrical protective sleeve 10. The protective sleeve 10 extends in axial direction from the processing roller 32 toward the outside in the direction of the drive transmission 15 and covers the corresponding attachment means 9 of the tool carriers 7.

The inside roll-up protective rings 8 each further include a radial outer region which is configured as a conical disc 13 and has an axial extension component outside of the processing roller 32 in the direction of the drive transmission 15. An inclined angle α of the conical disc 13 lies in a range between 20° and 30° referred to a radial direction 14. An outer diameter $D_R$ of the roll-up protective ring 8 is at least approximately 1.5 times the attachment diameter $D_B$. In the embodiment shown, the outer diameter $D_R$ is approximately twice the attachment diameter $D_B$. In the arrangement shown, the two inner roll-up protective rings 8 extend in an axial and radial direction so far that, in addition to the attachment means 9, also the lateral bearing regions 16 of the drive transmission 15 are partially covered over the periphery. The bearing regions 16 face toward the processing rollers 32. The radial extension of the roll-up protective rings 8 runs from an inner diameter $D_I$ to an outer diameter $D_R$. The roll-up protective ring 8 lies gap free with its inner diameter $D_I$ on the outer diameter $D_A$ of the carrier plate 29.

The carrier plates (29, 30) can have separate roll-up protective rings 8. In the embodiment shown, the carrier plates (29, 30) are configured as one piece with the corresponding roll-up protective rings 8 and form an end plate (5, 6) extending in radial direction. In other embodiments of the work tool 1, especially in the form of a bristle roller, a cultivator blade or the like, a carrier plate (29, 30) can be omitted. The end plates (5, 6) can be configured exclusively by the corresponding roll-up protective rings 8.

It is understood that the foregoing description is that of the preferred embodiments of the invention and that various changes and modifications may be made thereto without departing from the spirit and scope of the invention as defined in the appended claims.

What is claimed is:

1. A motor-driven work apparatus comprising:
   a rotatably driven work tool for ground processing and said rotatably driven work tool defining a rotational axis and having a longitudinal end;
   a drive transmission operatively connected to said work tool and said drive transmission including a lateral bearing region;
   said lateral bearing region defining an axial direction and facing toward said work tool;
   said work tool defining a flight circle as said work tool rotates about said rotational axis and said flight circle having a diameter ($D_F$);
   said work tool having an end plate connected thereto so as to rotate therewith;
   said end plate being disposed at said longitudinal end of said work tool so as to lie perpendicular to said rotational axis and said end plate having an outer diameter ($D_R$) which is less than said flight circle diameter ($D_F$);
   said end plate being configured as a roll-up protective ring for preventing the roll-up of long fibrous material;

said roll-up protective ring being configured as a conical disc in at least a component region thereof and said roll-up protective ring extending from an inner diameter ($D_I$) to said outer diameter ($D_R$); and, said roll-up protective ring extending outwardly away from said work tool so as to at least partially overlap said lateral bearing region in said axial direction thereby hindering an accumulation of said long fibrous material at said lateral bearing region.

2. The motor-driven work apparatus of claim 1, further comprising:

a drive transmission mounted at said longitudinal end and being operatively connected to said work tool for imparting rotation thereto about said rotational axis;

said drive transmission including a lateral bearing assembly facing toward said work tool; and, said roll-up protective ring being adjacent to said lateral bearing assembly and at least partially covering said lateral bearing assembly in the direction of said rotational axis.

3. The motor-driven work apparatus of claim 2, wherein said roll-up protective ring is configured as a conical disc in at least a part region thereof.

4. The motor-driven work apparatus of claim 3, wherein said conical disc defines an inclined angle ($\alpha$) referred to the radial direction lying in a range of between 20° and 30°.

5. The motor-driven work apparatus of claim 4, wherein said roll-up protective ring is configured as an approximately cylindrical protective sleeve in at least a part region thereof.

6. The motor-driven work apparatus of claim 5, further comprising a running wheel mounted laterally of said work tool and said running wheel having a peripherally extending slot; and, said cylindrical protective sleeve extending into said peripherally extending slot.

7. A motor-driven work apparatus comprising:

a rotatably driven work tool defining a rotational axis and having a longitudinal end;

a drive transmission operatively connected to said work tool and said drive transmission including a lateral bearing region;

said lateral bearing region defining an axial direction and facing toward said work tool;

said work tool defining a flight circle as said work tool rotates about said rotational axis and said flight circle having a diameter ($D_F$);

said work tool having an end plate connected thereto so as to rotate therewith;

said end plate being disposed at said longitudinal end of said work tool so as to lie perpendicular to said rotational axis and said end plate having an outer diameter ($D_R$) which is less than said flight circle diameter ($D_F$);

said end plate being configured as a roll-up protective ring for preventing the roll-up of long fibrous material;

said roll-up protective ring being configured as a conical disc in at least a component region thereof and said roll-up protective ring extending from an inner diameter ($D_I$) to said outer diameter ($D_R$);

said roll-up protective ring extending outwardly away from said work tool so as to at least partially overlap said lateral bearing region in said axial direction thereby hindering an accumulation of said long fibrous material at said lateral bearing region;

wherein said work tool is a processing roller which is driveable in rotation about said rotational axis and said longitudinal end is a first longitudinal end; said work tool includes a first carrier plate defined by said end plate and said work tool has a second longitudinal end; and, said work tool further includes:

a second carrier plate at said second longitudinal end perpendicular to said rotational axis;

a plurality of tool carriers attached to said carrier plates so as to be supported therebetween so as to lie on an attachment circle having an attachment diameter ($D_B$);

said first and second carrier plates each having an outer diameter ($D_A$) which is slightly greater than said attachment diameter ($D_B$); and, said roll-up protective ring being a first roll-up protective ring and being flush with an inner diameter ($D_I$) thereof on the outside to said outer diameter ($D_A$) of said first carrier plate.

8. The motor-driven work apparatus of claim 7, further comprising attachment means on the outside of said carrier plates for said tool carriers; and, said roll-up protective ring extending in axial direction over and beyond said attachment means.

9. The motor-driven work apparatus of claim 8, wherein said outer diameter ($D_R$) of said roll-up protective ring has a diameter of at least approximately 1.5 times to approximately 2 times said attachment diameter ($D_B$).

10. The motor-driven work apparatus of claim 9, wherein said carrier plate and said roll-up protective ring are configured as one piece.

11. The motor-driven work apparatus of claim 10, wherein there are two of said work tools mounted symmetrically with respect to said drive transmission mounted therebetween.

* * * * *

UNITED STATES PATENT AND TRADEMARK OFFICE
CERTIFICATE OF CORRECTION

| | | |
|---|---|---|
| PATENT NO. | : 7,303,025 B2 | Page 1 of 1 |
| APPLICATION NO. | : 11/013438 | |
| DATED | : December 4, 2007 | |
| INVENTOR(S) | : Guenter Mayer | |

It is certified that error appears in the above-identified patent and that said Letters Patent is hereby corrected as shown below:

In the Title Page:
Item (30) Foreign Application Priority Data: delete "103 60 885" and substitute -- 103 60 888 -- therefor.

In column 2:
Line 43: delete "like" and insert -- like. An overload of the deflecting bristles, tines or the like -- therefor.

Signed and Sealed this

Twenty Second Day of April, 2008

JON W. DUDAS
*Director of the United States Patent and Trademark Office*